April 23, 1946.  H. R. C. ANTHONY  2,399,089
LEAKPROOF DRY CELL
Filed Aug. 29, 1942
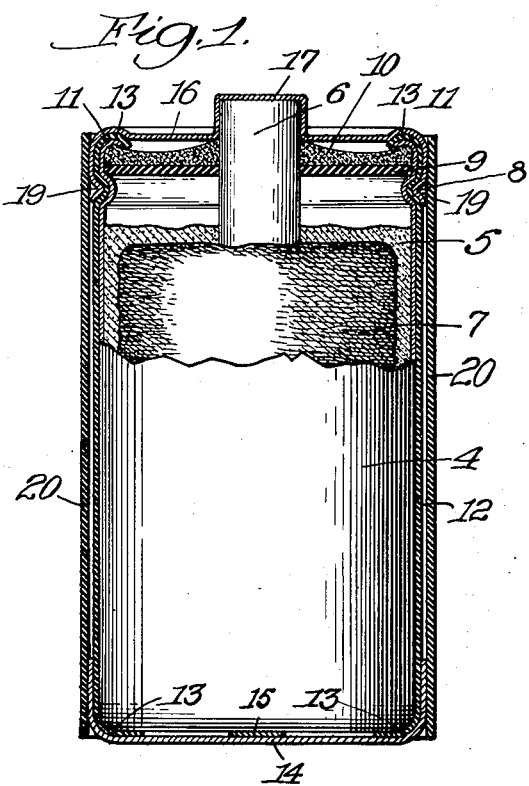
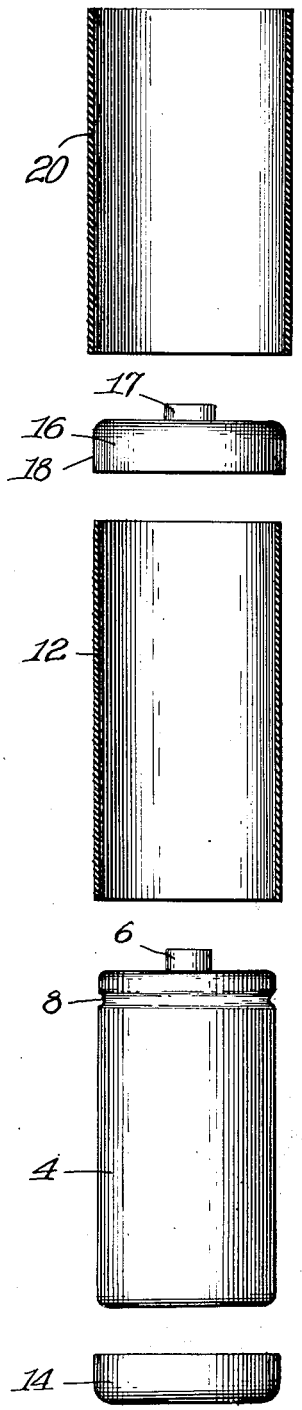
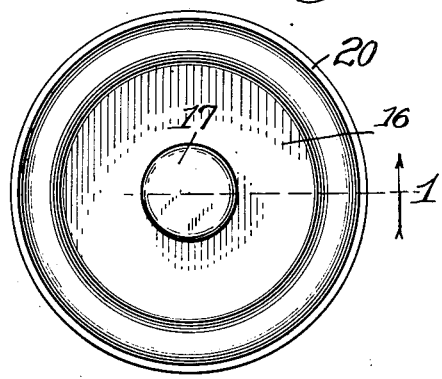
Inventor:
Herman R. C. Anthony.
By Chritton, Wiles, Davis & Hirsch.
Attys.

Patented Apr. 23, 1946

2,399,089

UNITED STATES PATENT OFFICE 2,399,089

LEAKPROOF DRY CELL

Herman R. C. Anthony, Madison, Wis., assignor to Ray-O-Vac Company, a corporation of Wisconsin Application August 29, 1942, Serial No. 456,611

3 Claims. (Cl. 136—133)

This invention relates to dry-cells of the type used in flash lights, and more particularly to an improved construction for preventing leakage of the electrolyte and swellage of the cell which might damage associated equipment.

The primary object of the present invention is to enclose the zinc electrode with a thin rubber-like sheath which may be formed of natural rubber, or synthetic material such as "Pliofilm," to protect an outer casing against being attacked by the electrolyte which may eventually eat through the zinc electrode.

In the ordinary dry-cells in common use, the side walls are commonly enclosed by a heavy paper tube. However, after a cell is discharged and electrolyte is permitted to escape into contact with the paper jacket, it will wet the jacket and impair its mechanical strength so that the worn out cell may swell and damage a flash light casing or other equipment in which the cell is used. In the present invention, the outer jacket is protected from wetting or chemical action by a moisture-proof sheath and the jacket thereby retains sufficient mechanical strength to withstand heavy internal gas pressure and prevent material or substantial expansion of the cell.

The invention is illustrated in a preferred embodiment in the accompanying drawing, in which—

Figure 1 is a vertical sectional view of a cell embodying the invention, taken as indicated at line 1 of Figure 2; Figure 2, a top plan view of the cell; and Figure 3, an exploded view of the various parts, in which the protective sheath and outer casing are shown in section.

In the embodiment illustrated, a zinc metal electrode 4 may be in the form of a cup containing electrolyte 5 and a centrally disposed carbon electrode 6 surrounded by a bobbin of depolarizing mix 7. Preferably the upper end of the cup is provided with an inwardly turned groove 8 which provides a shoulder on which rests an insulating washer 9 which is impaled by and snugly fits around the electrode 6. The upper end of the cell is closed by suitable asphalt or sealing wax 10. As shown in Figure 1, the upper end of the zinc electrode is turned inwardly, as indicated at 11, to provide a round shoulder.

A thin tubular elastic member 12, which may be of natural or synthetic rubber, is then pulled over the cell and its end portions will naturally pull inwardly and partially overlap the end portions of the zinc electrode, as indicated at 13. A bottom cap 14, which preferably has a centrally disposed drop of solder 15, is then forced over the lower end of the sheathed cell and may be soldered to the bottom of the zinc cup by momentarily touching the outer side of the cap 14 with a soldering iron. The solder forms an electric connection with the zinc electrode and prevents the cap from being forced off by internal gas pressure.

The top cap 16 preferably is provided with a socket member 17 to receive the carbon electrode 6 and has a downwardly extending flange 18 which passes around the sheath 12 and is crimped firmly into the groove 8, as indicated at 19.

Finally, the outer jacket 20, which may be made of any suitable tensilely strong material, is slipped over the cell and the unit is then ready for use. If desired, the jacket 20 may be made of plastic material but for economy reasons specially treated cardboard or kraftpaper is preferred. When the cell is used and internal pressure is developed, the walls of the zinc electrode may expand laterally, pressing the rubberous sheath against the walls of the casing 20 but are prevented from further distension by the strength of the material of the casing.

It will be understood that the outer casing 20 may be made of sheet metal but if such an electrically conductive material is used, it should be insulated from both electrodes by interposing insulating materials between the casing and the clamping flanges of the end caps.

The foregoing detailed description has been given for clearness of understanding only, and no unnecessary limitations should be understood therefrom for some modifications will be obvious to those skilled in the art.

I claim:

1. A leak-proof dry-cell provided with circuit terminals at opposite ends, comprising: a hollow cylindrical zinc electrode containing electrolyte; a centrally disposed carbon electrode and depolarizing mix in said electrolyte; a sheath of thin flexible rubbery material, which is resistant to penetration by electrolyte, tightly embracing the side walls and overlapping the marginal end portions of said zinc electrode; a metal base cap with an upwardly extending flange tightly embracing the sheathed lower end of the zinc electrode and electrically connected to said electrode so as to form an exposed bottom terminal for the cell; a metal top member having a downwardly extending flange insulated from and tightly embracing the sheathed upper end of said zinc electrode and electrically connected to said carbon electrode; and an outer cylindrical belt-like jacket of tensilely strong insulating material which embraces said flanges and is coextensive with the zinc electrode to prevent substantial lateral distension thereof.

2. A dry-cell as specified in claim 1, in which the upper portion of the zinc electrode has an inwardly extending groove providing an inner shoulder on which an insulating washer rests and is covered with sealing material, and the metal top has a downwardly extending flange crimped inwardly into said groove below the plane of said washer.

3. A dry-cell as specified in claim 1, in which the base cap is electrically connected to the bottom center of the zinc electrode by means of solder which also resists removal of said cap.

HERMAN R. C. ANTHONY.